United States Patent
Chang et al.

(10) Patent No.: US 11,765,711 B2
(45) Date of Patent: Sep. 19, 2023

(54) UNICAST AND GROUPCAST TRANSMISSIONS OVER SIDELINK

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 182 days.

(21) Appl. No.: 17/435,673

(22) PCT Filed: Mar. 27, 2020

(86) PCT No.: PCT/US2020/025548
§ 371 (c)(1),
(2) Date: Sep. 1, 2021

(87) PCT Pub. No.: WO2020/198715
PCT Pub. Date: Oct. 1, 2020

(65) Prior Publication Data
US 2022/0141834 A1    May 5, 2022

Related U.S. Application Data (60) Provisional application No. 62/825,638, filed on Mar. 28, 2019.

(51) Int. Cl.
*H04W 72/12* (2023.01)
*H04W 72/121* (2023.01)
(Continued)

(52) U.S. Cl.
CPC ....... *H04W 72/121* (2013.01); *H04L 12/1868* (2013.01); *H04W 4/46* (2018.02); *H04W 72/1263* (2013.01)

(58) Field of Classification Search
CPC . H04W 72/121; H04W 4/46; H04W 72/1263; H04W 4/08; H04W 72/12; H04W 92/18; H04L 12/1868; H04L 1/18
See application file for complete search history.

(56) References Cited

U.S. PATENT DOCUMENTS

2016/0219620 A1*   7/2016  Lee .................. H04W 72/04
2020/0186290 A1*   6/2020  Zhang ............... H04L 1/0073
(Continued)

OTHER PUBLICATIONS

NR V2X support for unicast and groupcast communication (Year: 2018).*
(Continued)

*Primary Examiner* — Mewale A Ambaye (57) ABSTRACT

The methods, devices, and systems discussed herein describe four different mechanisms (e.g., solutions) to assist a leader of a group of wireless communication devices in deciding when to switch between groupcast and unicast transmissions. In the first solution, the group leader may decide to initiate groupcast or unicast without considering the design of the Access Stratum (AS) layer link management. In the second solution, the group leader can determine whether to initiate unicast transmission based, at least partially, on feedback messages received from one or more other members of the group. In the third solution, the group leader has the option to simultaneously transmit groupcast and unicast transmissions towards the same user equipment devices (UEs). In the fourth solution, the group leader indicates to the groupcast-receiving UEs that the transmission is about to be switched from groupcast to unicast.

20 Claims, 7 Drawing Sheets

(51) Int. Cl.
  H04W 4/46 (2018.01)
  H04L 12/18 (2006.01)
  H04W 72/1263 (2023.01)

(56) References Cited

U.S. PATENT DOCUMENTS

2021/0045093 A1* 2/2021 Rao .................. H04W 36/0009
2023/0124233 A1* 4/2023 Lee ....................... H04W 72/25
                                                         370/329

OTHER PUBLICATIONS

Discussion on HARQ support for NR sidelink (Year: 2019).*
QoS management for NR V2X, Athens (Year: 2019).*
Fraunhofer HHI, Fraunhofer IIS; "NR V2X support for Unicast and Groupcast Communication," R2-1816772; 3GPP TSG-RAN WG2 Meeting #104; Nov. 1, 2018; Spokane, US.
Apple Inc.; "QoS Handling in NR V2X," R2-1817468; 3GPP TSG-RAN WG2 Meeting #104; Nov. 12, 2018; Spokane, US.
Intel Corporation; "Considerations on NR sidelink unicast and groupcast support for V2X," R2-1818179; 3GPP TSG-RAN WG2 Meeting #104; Nov. 12, 2018; Spokane, US.
CATT; "PDCP functions for NR V2XSidelink," R2-1900192; 3GPP TSG-RAN WG2 Meeting #105; Feb. 15, 2019; Athens, GR.
ITRI; "NR V2X Support for Sidelink unicast and groupcast," R2-1900831; 3GPP TSG-RAN WG2 Meeting #105; Feb. 14, 2019; Athens, GR.
Lenovo, Motorola Mobility; "QoS management for NR V2X," R2-1901053; 3GPP TSG-RAN WG2 Meeting #105; Feb. 15, 2019; Athens, GR.
Huawei, HiSilicon; "Discussion on HARQ support for NR sidelink," R2-1902049; 3GPP TSG-RAN WG2 Meeting #105; Feb. 15, 2019; Athens, GR.
LG Electronics Inc.; "Unicast-assisted groupcast transmissions," R2-1902158; 3GPP TSG-RAN WG2 Meeting #105; Feb. 15, 2019; Athens, GR.

* cited by examiner

UNICAST AND GROUPCAST TRANSMISSIONS OVER SIDELINK

CLAIM OF PRIORITY

The present application claims priority to Provisional Application No. 62/825,638, entitled "UNICAST AND GROUPCAST TRANSMISSIONS OVER SIDELINK", filed Mar. 28, 2019, which is assigned to the assignee hereof and hereby expressly incorporated by reference in its entirety.

FIELD

This invention generally relates to wireless communications and more particularly to vehicle-to-everything (V2X) communications between wireless communication devices.

BACKGROUND

Unicast transmissions are meant for one-to-one communications, meaning there is one sender and one intended receiver. Groupcast transmissions, on the other hand, are meant for transmissions from one sender to members of a group of intended receiving devices.

SUMMARY

The methods, devices, and systems discussed herein describe four different mechanisms (e.g., solutions) to assist a leader of a group of wireless communication devices in deciding when to switch between groupcast and unicast transmissions. In the first solution, the group leader may decide to initiate groupcast or unicast without considering the design of the Access Stratum (AS) layer for link management. In the second solution, the group leader can determine whether to initiate unicast transmission based, at least partially, on feedback messages received from one or more other members of the group. In the third solution, the group leader has the option to simultaneously transmit groupcast and unicast transmissions towards the same user equipment devices (UEs). In the fourth solution, the group leader indicates to the groupcast-receiving UEs that the transmission is about to be switched from groupcast to unicast.

DETAILED DESCRIPTION

The examples discussed below are generally directed to vehicle-to-everything (V2X) communication, which is the passing of information from a vehicle to any entity that may affect the vehicle or that the vehicle may affect. For example, V2X is a vehicular communication system that incorporates other, more specific types of communication, including vehicle-to-vehicle (V2V), V2I (vehicle-to-infrastructure), V2N (vehicle-to-network), V2P (vehicle-to-pedestrian), V2D (vehicle-to-device), and V2G (vehicle-to-grid). There are two types of V2X communication technology depending on the underlying technology being used: wireless local area network (WLAN)-based V2X, and cellular-based V2X (C-V2X). Some examples of V2X protocols include Long-Term Evolution (LTE) (Rel-14) V2X Mode 4 and 5G New Radio (NR) V2X Mode 2.

Sidelink groupcast and unicast transmissions are both supported for V2X over the sidelink (SL) channel or the PC5 interface, which is an interface used for direct communication between a user equipment device (UE) and another UE. Unicast is meant for one-to-one communications, meaning there is one sender and one intended receiver. Groupcast is meant to support one-to-many communications. As used herein, groupcast transmissions are transmissions from one sender to members of a group of intended receiving devices.

One of the main use cases for groupcast is for vehicles that are platooning, which enables the vehicles to dynamically form a platoon (e.g., a group) while traveling together. In some of the examples described herein, the wireless communication devices are vehicle user equipment devices (VUEs), and the group of wireless communication devices is a platoon of VUEs. The group leader of the platoon, which is the lead vehicle, in some cases, transmits information to the other vehicles in the platoon. The information transmitted by the group leader is used to manage the platoon and allows the vehicles to drive closer than normal in a coordinated manner (e.g., going in the same direction and traveling together). Vehicles in the same platoon share the necessary information required to support platoon operations (e.g., distance between vehicles, relative speed, updates from Road Side Units (RSUs), etc.). Similar requirements apply also for the Extended Sensor use case where UEs exchange data gathered through local sensors or live video data among vehicles, RSUs, devices of pedestrians, and V2X application servers.

For the purpose of Layer 2 analysis, it is assumed that upper layers (e.g., above the Access Stratum) provide the information on whether a transmission is a unicast or groupcast transmission for a particular data transfer. For a unicast transmission over SL, the following information is known to Layer 2: destination identifier (ID) and source ID. In these examples, the destination ID identifies the intended recipient (e.g., wireless communication device) of the unicast transmission, and the source ID identifies the wireless communication device that transmitted the unicast transmission. For a groupcast transmission over SL, the following information is known to Layer 2: destination Group ID and source ID. In these examples, the destination Group ID identifies the intended group of recipients (e.g., group of wireless communication devices) of the groupcast transmission, and the source ID identifies the wireless communication device that transmitted the groupcast transmission. Any UE configured to receive a Layer 2 destination Group ID is allowed to receive the groupcast transmission, whether the receiving UE is within or beyond a "communication range" of the transmitting UE, as provided by upper layers.

For AS-level link management in unicast, SL Radio Link Monitoring/Radio Link Failure (RLM/RLF) declaration is supported. For Radio Link Control (RLC) Acknowledged Mode (AM) in SL unicast, RLF declaration is triggered by indication from RLC that the maximum number of retransmissions has been reached. The AS-level link status (e.g., failure) should be informed to upper layers.

No RLM design specific to groupcast, different than the RLM procedure for unicast, is currently considered. Thus, there is not a current need for RLM/RLF declarations among group members for groupcast. However, if RLM/RLF declarations are supported in the future for groupcast transmissions, groupcast may become a more attractive option since it requires fewer resources than unicast transmissions. Discovery procedure and related messages for unicast and groupcast transmission are determined by upper layers.

Unicast for SL or PC5 will support a Radio Resource Control (RRC)-like mechanism while groupcast will mainly rely on upper layers for link management since PC5 RRC connection establishment and RLM/RLF declaration among group members for groupcast are not currently supported. The results of these two sets of agreements implies unicast has a tighter control in the AS layer. Without RLM/RLF declaration, there may be delays in recovering the service. Furthermore, the Modulation and Coding Scheme (MCS) for unicast may be readily adapted specifically for the receiving UEs. From this perspective, unicast can be seen as having better reliability and shorter latency over groupcast.

In some cases, if the group is small, it may make sense to establish multiple unicast connections rather than to utilize groupcast, even if additional resources are needed to support multiple connections. This is especially important in the case of RLF, whereby a quick recovery mechanism may be needed to reduce latency. The decision may be based on the criteria of the service type, and it is up to UE implementation.

Assuming there is an ongoing unicast between two UEs and another UE enters to form a group, multiple unicast connections may be established to communicate among these UEs even if the transmissions are identical. In this sense the protocol can work, albeit not as efficiently since fewer transmissions (and fewer resources) are needed if a groupcast is set up for these UEs. Power consumption is usually not an issue for vehicle UEs (VUEs). So, the main concern is resource utilization.

Going from groupcast to unicast may be more complicated since the group leader may need to decide when to terminate groupcast and initiate unicast. One possibility would be for the groupcast to continue even if there are only two UEs remaining in the group, but this is suboptimal since the reliability from AS layer RLM and the feedback mechanism for unicast will not be available. Thus, it makes sense to try to establish a unicast connection as soon as possible. Since UEs outside the "communication range" of the transmitting UE can still receive groupcast messages, it may not be easy to determine when unicast may be used instead of groupcast.

In light of the foregoing, it is necessary to have a mechanism to assist a platoon leader (or transmitting UE, in general) in deciding when to switch between groupcast and unicast transmissions. Thus, the methods, devices, and systems discussed herein describe four different mechanisms (e.g., solutions) to assist a platoon leader (or transmitting UE, in general) in deciding when to switch between groupcast and unicast transmissions.

In the first solution, the group leader may decide to initiate groupcast or unicast without considering the design of the AS layer link management. In the second solution, the group leader can determine whether to initiate unicast transmission based, at least partially, on feedback messages received from one or more other members of the group. In the third solution, the group leader has the option to simultaneously transmit groupcast and unicast transmissions towards the same UE(s). In the fourth solution, the group leader indicates to the groupcast-receiving UEs that the transmission is about to be switched from groupcast to unicast.

Although the different solutions may be described separately, any of the features of any of the solutions may be added to, omitted from, or combined with any other solution. Similarly, any of the features of any of the solutions may be performed in parallel or performed in a different manner/order than that described or shown herein.

Figure 1A:
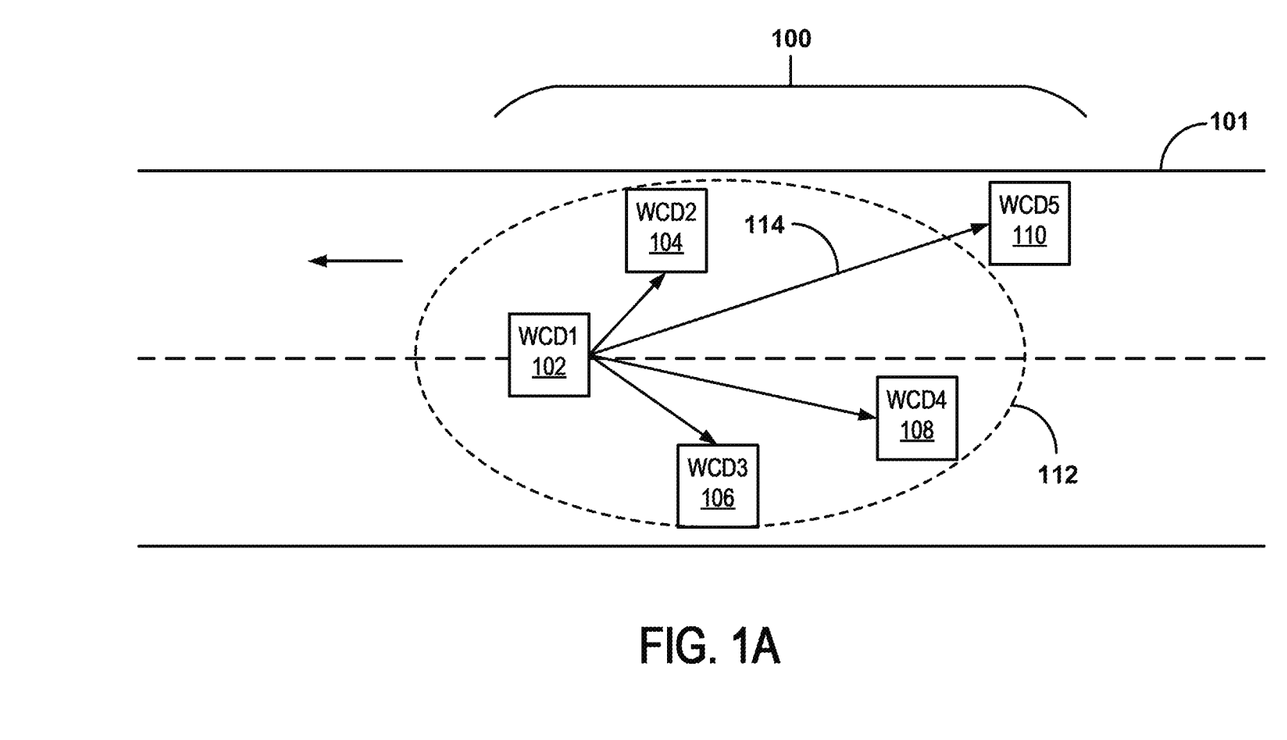
FIG. 1A is a block diagram of an example of a system in which a group leader of a group of wireless communication devices transmits a groupcast transmission over a sidelink channel to other wireless communication devices within the group.

FIG. 1A is a block diagram of an example of a system in which a group leader of a group of wireless communication devices transmits a groupcast transmission over a sidelink channel to other wireless communication devices within the group. For the example of FIG. 1A, a group 100 of wireless communication devices is located on roadway 101. The group 100 includes first wireless communication device, WCD1, 102, second wireless communication device, WCD2, 104, third wireless communication device, WCD3, 106, fourth wireless communication device, WCD4, 108, and fifth wireless communication device, WCD5, 110. In other examples, any of the wireless communication devices may act as the group leader, and the group leader may dynamically change depending on any suitable factors, including, for example, which wireless communication devices join/leave the group, changing signal conditions, network load, etc. In further examples, the group 100 may have a different number of wireless communication devices than that shown in FIG. 1A.

The first wireless communication device 102 is the leader of group 100. First wireless communication device 102 transmits groupcast transmissions 114 to the other wireless communication devices 104, 106, 108, 110 of the group 100. Although fifth wireless communication device 110 is outside of communication range 112 of the group leader 102, fifth wireless communication device 110 is authorized to receive the groupcast transmissions 114.

The group 100 is wirelessly connected to a radio access network (not shown) via one or more base stations (not shown), which provide various wireless services to one or more of the wireless communication devices that are part of the group 100. For the example shown in FIG. 1A, the group 100 operates in accordance with at least one revision of the 3rd Generation Partnership Project 5G New Radio (3GPP 5G NR) communication specification. In other examples, the group 100 may operate in accordance with other communication specifications.

In the example of FIG. 1A, wireless communication devices 102, 104, 106, 108, 110 are each integrated into a vehicle as an onboard unit (OBU). In other examples, wireless communication devices 102, 104, 106, 108, 110 may simply be user equipment (UE) devices that are located within a vehicle. Some examples of user equipment devices include: a mobile phone, a transceiver modem, a personal digital assistant (PDA), or a tablet, for example. Any of the foregoing devices may also be referenced herein as vehicle UEs (VUEs). Each wireless communication device 102, 104, 106, 108, 110 that is connected to group 100 is considered to be a member of group 100.

Figure 2:
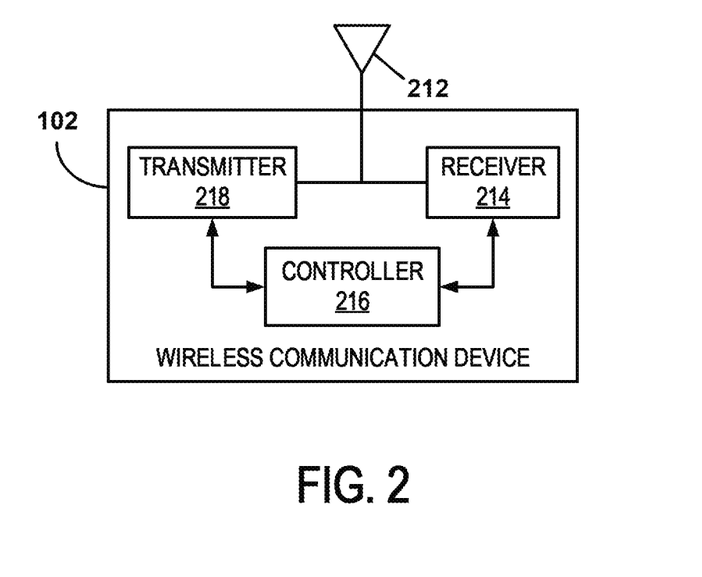
FIG. 2 is a block diagram of an example of a wireless communication device shown in FIG. 1A.

As shown in FIG. 2, wireless communication device 102 comprises controller 216, transmitter 218, and receiver 214, as well as other electronics, hardware, and code. Although FIG. 2 specifically depicts the circuitry and configuration of wireless communication device 102, the same wireless communication device circuitry and configuration is utilized for wireless communication devices 104, 106, 108, 110 in group 100. In other examples, any of the wireless communication devices may have circuitry and/or a configuration that differs from that of wireless communication device 102 shown in FIG. 2.

Wireless communication device 102 is any fixed, mobile, or portable equipment that performs the functions described herein. The various functions and operations of the blocks described with reference to wireless communication device 102 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a wireless communication device. An example of a suitable controller 216 includes code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2 perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the wireless communication device functions. The required components may depend on the particular functionality required by the wireless communication device.

Transmitter 218 includes a modulator (not shown), and receiver 214 includes a demodulator (not shown). The modulator can apply any one of a plurality of modulation orders to modulate the signals 114 to be transmitted over the sidelink channel. In the example of FIG. 1A, signals 114 are groupcast transmissions. The demodulator demodulates signals 114 received over the sidelink channel, in accordance with one of a plurality of modulation orders.

In operation in accordance with the first solution, the group leader (e.g., first wireless communication device 102) decides to initiate groupcast or unicast without considering the design of the AS layer link management. For example, it is assumed that the group leader always knows how many UEs are in the group, regardless of whether all of the UEs in the group can successfully receive transmissions from the group leader. Based on this knowledge of how many UEs are in the group, the group leader (e.g., first wireless communication device 102) decides whether to initiate groupcast or unicast transmissions of information to one or more of the other UEs in the group. However, as mentioned above, the reliability and latency of the service may be impacted if groupcast is selected over unicast in some scenarios that operate in accordance with the first solution.

In operation in accordance with the second solution, the group leader (e.g., first wireless communication device 102) determines whether to initiate unicast transmission based, at least partially, on feedback messages received from one or more other members of the group. In some examples of the second solution, the group leader utilizes Hybrid Automatic Repeat Request (HARQ) feedback messages, such as acknowledgement (ACK) signals and/or negative-acknowledgement (NACK) signals, to determine the number of receiving UEs. More specifically, the group leader (e.g., first wireless communication device 102) transmits signals 114, via its transmitter 218 and antenna 212, to one or more other wireless communication devices within group 100. First wireless communication device 102 then receives, via antenna 212 and receiver 214, feedback messages (e.g., ACK and/or NACK signals) from one or more of the wireless communication devices that received signals 114. Another example of feedback includes the use of keep-alive messages, which are messages sent by one device to another to (1) check that the between the two is operating, or (2) prevent the link from being broken. Thus, the keep-alive messages can be used by any of the UEs to request feedback (e.g., a keep-alive response message) from another UE or UEs in the same group. The keep-alive messages are handled in the V2X application layer rather than the AS layer. The keep-alive message may be sent as part of groupcast or unicast.

First wireless communication device 102 determines, using its controller 216, whether to initiate unicast transmission based, at least partially, on the received feedback messages. In some examples, first wireless communication device 102 determines whether to initiate unicast transmission based on the number of wireless communication devices that provide feedback messages. In other examples, first wireless communication device 102 determines whether to initiate unicast transmission based on the number of feedback messages (e.g., ACK messages, keep-alive response messages, and/or NACK messages) received from other wireless communication devices.

In operation in accordance with the third solution, the group leader (e.g., first wireless communication device 102) has the option to simultaneously transmit groupcast and unicast transmissions towards the same UE(s). More specifically, the group leader has the option to initiate one or more unicast connections without terminating the ongoing groupcast. In some examples, the group leader determines whether to initiate a unicast connection with a particular wireless communication device based, at least partly, on feedback (e.g., HARQ) messaging received from that particular wireless communication device.

Figure 1B:
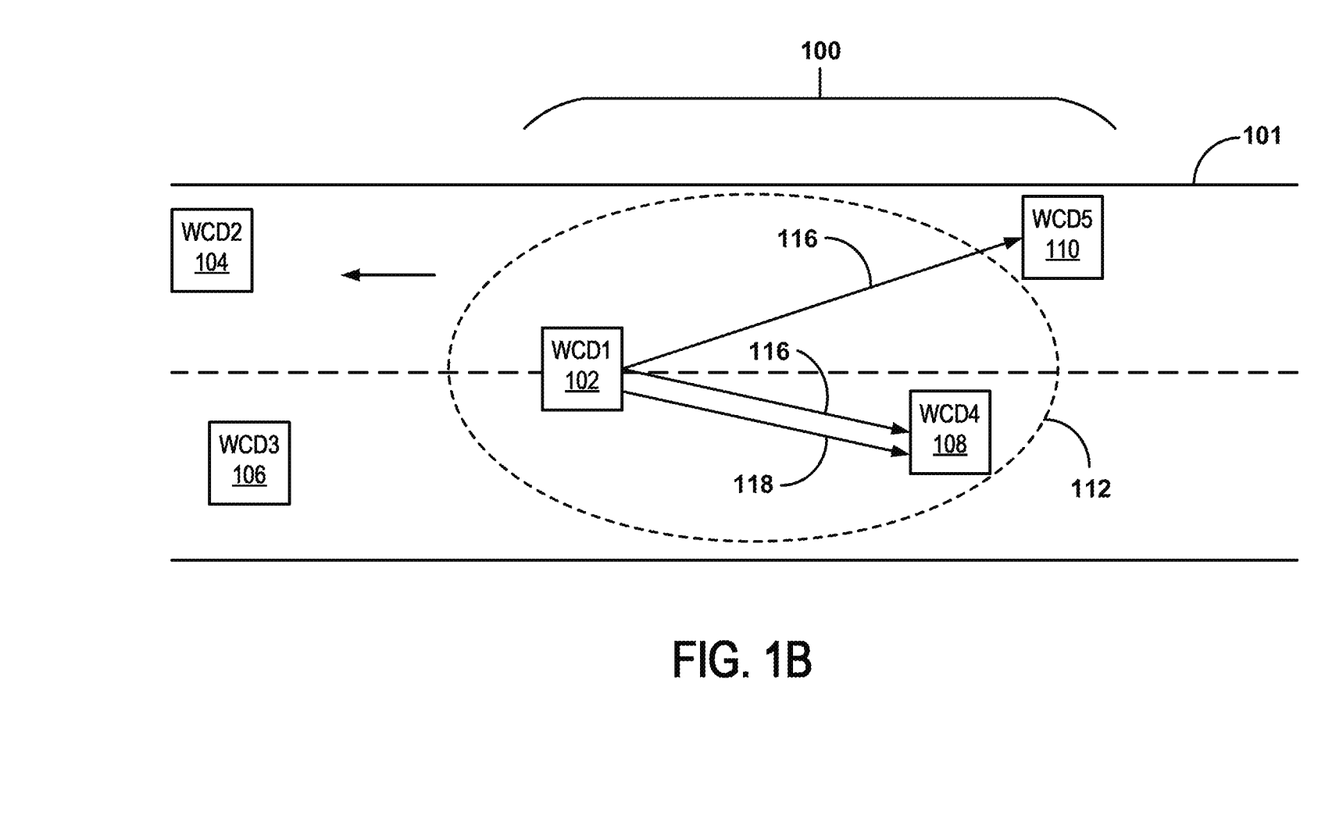
FIG. 1B is a block diagram of an example of the system of FIG. 1A in which the group leader initiates unicast transmissions over the sidelink channel to at least one of the other wireless communication devices within the group.

FIG. 1B illustrates an example according to the third solution in which the group leader initiates unicast transmissions over the sidelink channel to at least one of the other wireless communication devices within the group without terminating the ongoing groupcast. For example, first wireless communication device 102 initially transmits, via its transmitter 218 and antenna 212, a groupcast transmission 116 over a sidelink channel to other wireless communication devices within the group 100 of wireless communication devices. As shown in FIG. 1B, wireless communication devices 104, 106 leave the group 100, which means that first wireless communication device 102 will only need to communicate with wireless communication devices 108, 110.

In the example of FIG. 1B, first wireless communication device 102 determines whether to initiate a unicast connection with a particular wireless communication device 108 based, at least partly, on feedback (e.g., HARQ) messaging received from that particular wireless communication device 108. In this regard, although FIG. 1B only shows unicast transmission to a single wireless communication device 108, first wireless communication device 102 could transmit unicast transmissions to any number of other wireless communication devices that were within communication range 112 of first wireless communication device 102.

Upon determining that a unicast connection should be initiated, first wireless communication device 102 initiates a unicast transmission 118, via its transmitter 218 and antenna 212, over the sidelink channel to at least one of the other wireless communication devices 108 for better reliability and shorter latency. Thus, first wireless communication device 102 simultaneously transmits the groupcast transmission 116 and the unicast transmission 118 to fourth wireless communication device 108.

Since fifth wireless communication device 110 is outside the communication range 112 of first wireless communication device 102, first wireless communication device 102 may not know if fifth wireless communication device 110 is still listening to first wireless communication device 102 since fifth wireless communication device 110 does not send HARQ feedback messages to first wireless communication device 102. Therefore, first wireless communication device 102 will continue to send information (e.g., a set of data) via groupcast transmissions 116 while also sending the same information (e.g., same set of data) via unicast transmissions 118 to fourth wireless communication device 108. In this case, fourth wireless communication device 108 may receive duplicated data over both groupcast and unicast, requiring fourth wireless communication device 108 to handle duplication (e.g., reception) of multiple transmissions of the same data.

Figure 1C:
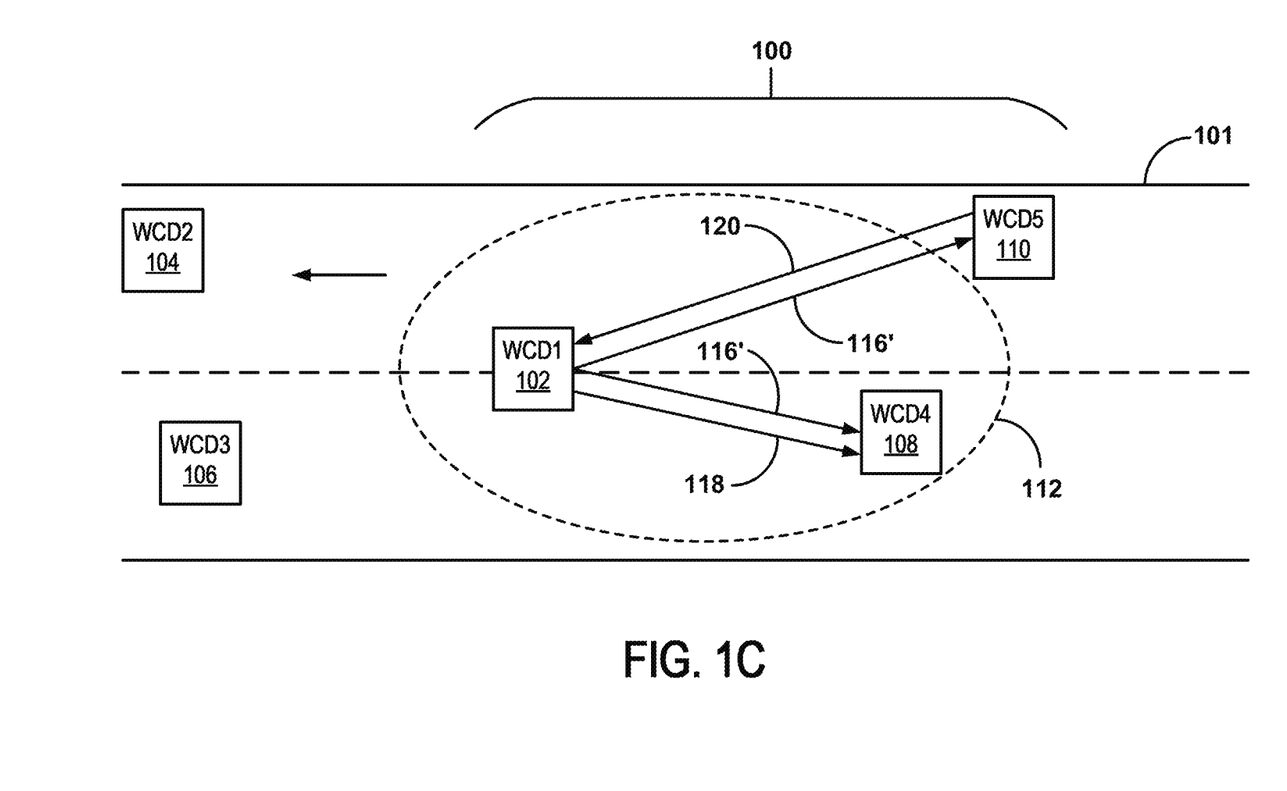
FIG. 1C is a block diagram of an example of the system of FIG. 1A in which the group leader (1) transmits an indication that transmission of data via groupcast transmission will be switched to transmission of data via unicast transmission, and (2) receives a unicast transmission from a wireless communication device that is outside of a communication range of the group leader.

In operation in accordance with the fourth solution, the group leader provides an indication in the ongoing groupcast that the transmission will be switched to unicast. FIG. 1C illustrates an example according to the fourth solution, which is similar to what was described in connection with the third solution, except in the fourth solution, the group leader includes an indication within the groupcast that the groupcast transmission will be switched to unicast.

More specifically, first wireless communication device 102 transmits, via its transmitter 218 and antenna 212, a groupcast transmission 116' over a sidelink channel to other wireless communication devices within the group 100 of wireless communication devices. Groupcast transmission 116' of FIG. 1C includes an indication that transmission of data via groupcast transmission will be switched to transmission of data via unicast transmission. Fourth wireless communication device 108 and fifth wireless communication device 110 both receive groupcast transmission 116' via their respective antennas 212 and receivers 214. The difference is that fourth wireless communication device 108 is located within communication range 112 of first wireless communication device 102, but fifth wireless communication device 110 is located outside of communication range 112 of first wireless communication device 102.

First wireless communication device 102 ceases transmission of data via groupcast and initiates a unicast transmission 118, via its transmitter 218 and antenna 212, over the sidelink channel to at least one of the other wireless communication devices 108. In some examples, first wireless communication device 102 determines whether to initiate a unicast connection with a particular wireless communication device 108 based, at least partly, on feedback (e.g., HARQ) messaging received from that particular wireless communication device 108. Although FIG. 1C only shows unicast transmission to a single wireless communication device 108, first wireless communication device 102 could transmit unicast transmissions to any number of other wireless communication devices that were within communication range 112 of first wireless communication device 102.

In response to receiving the indication in groupcast transmission 116' that transmission of data via groupcast transmission will be switched to transmission of data via unicast transmission, fifth wireless communication device 110 determines whether to initiate a unicast connection with first wireless communication device 102. For example, when the first wireless communication device 102 (or transmitting UE) sends a groupcast message it would indicate its own location, which may be based on Global Positioning System (GPS) information or a zone ID included within groupcast transmission 116'. Fifth wireless communication device 110 can use the location information received from first wireless communication device 102 to determine whether it is within communication range 112 by comparing its own GPS location or zone with that of the group leader's location.

Even if the fifth wireless communication device 110 is not within communication range 112, it may still be able to receive transmissions from the group leader. However, fifth wireless communication device 110 is not required to send HARQ feedback to the group leader. Since fifth wireless communication device 110 is outside of communication range 112 of first wireless communication device 102, first wireless communication device 102 cannot detect the presence of fifth wireless communication device 110. Thus, fifth wireless communication device 110 is "invisible" to first wireless communication device 102 since first wireless communication device 102 cannot successfully receive feedback (e.g., HARQ) messaging from fifth wireless communication device 110. Accordingly, it is up to fifth wireless communication device 110 to initiate a unicast connection with first wireless communication device 102.

Upon determining that a unicast connection should be initiated, fifth wireless communication device 110 transmits, via its transmitter 218 and antenna 212, a unicast transmission 120 to first wireless communication device 102. First wireless communication device 102 receives, via its antenna 212 and receiver 214, the unicast transmission 120 from fifth wireless communication device 110. Upon receipt of the unicast transmission 120 from fifth wireless communication device 110, first wireless communication device 102 will continue communicating with fifth wireless communication device 110 via a unicast connection.

However, in some cases, even if the fifth wireless communication device 110 is within the communication range 112, the network may only configure the receiving UEs to send NACK and not ACK. In this case, even if the fifth wireless communication device 110 is within the communication range 112, it is not known by the first wireless communication device 102. In still other cases, the first wireless communication device 102 may also send a keep-alive request message to the fifth wireless communication device 110 in the groupcast just to check if the fifth wireless communication device 110 is still within reach using groupcast transmission. If the first wireless communication device 110 does not receive a keep-alive response message, it may decide to initiate a unicast connection with the fifth wireless communication device 110.

Figure 3:
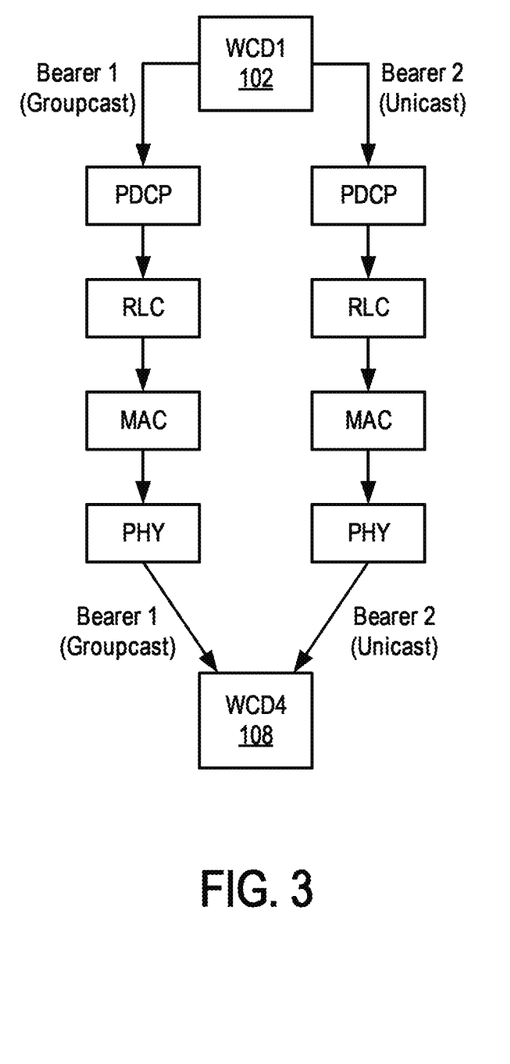
FIG. 3 is an example of a groupcast transmission and a unicast transmission being transmitted on separate data bearers.

FIG. 3 is an example of a groupcast transmission and a unicast transmission being transmitted on separate data bearers. More specifically, FIG. 3 illustrates a groupcast transmission sent from first wireless communication device 102 via Bearer 1, which proceeds via a Packet Data Convergence Protocol (PDCP) layer, a Radio Link Control (RLC) layer, a Media Access Control (MAC) layer, and a Physical (PHY) layer to fourth wireless communication device 108. First wireless communication device 102 also sends a unicast transmission via Bearer 2, which proceeds via the PDCP layer, the RLC layer, the MAC layer, and the PHY layer to fourth wireless communication device 108.

Figure 4:
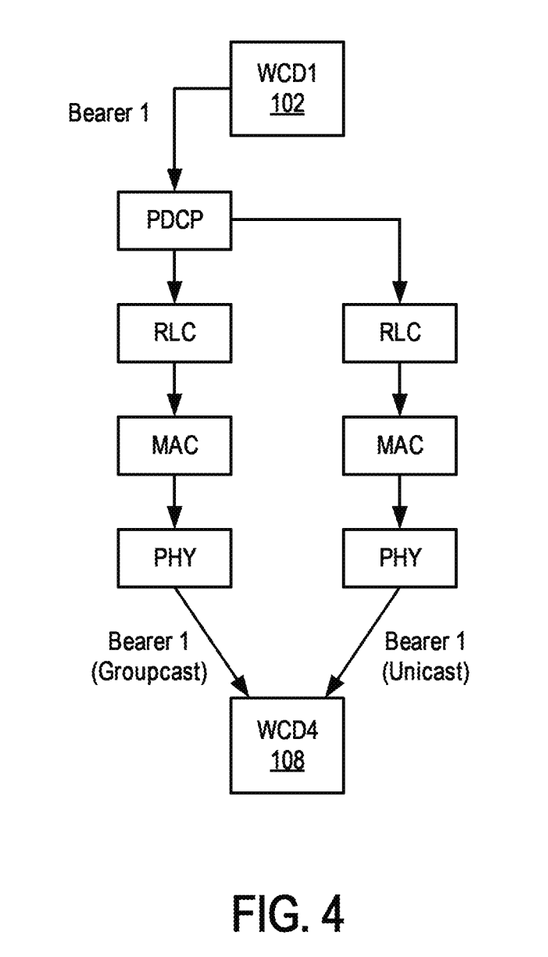
FIG. 4 is an example of a groupcast transmission and a unicast transmission being transmitted on the same data bearer, where the data bearer is split at a Packet Data Convergence Protocol level. The groupcast transmission is transmitted over a first radio link from the split data bearer, and the unicast transmission is transmitted over a second radio link from the split data bearer.

FIG. 4 is an example of a groupcast transmission and a unicast transmission being transmitted on the same data bearer, where the data bearer is split at the Packet Data Convergence Protocol level. The groupcast transmission is transmitted over a first radio link from the split data bearer, and the unicast transmission is transmitted over a second radio link from the split data bearer. More specifically, FIG. 4 illustrates that both the groupcast transmission and the unicast transmission are sent from first wireless communication device 102 via Bearer 1, which is split at the Packet Data Convergence Protocol (PDCP) level. After being split at the PDCP level, the groupcast transmission proceeds over a first radio link from the split Bearer 1 via the RLC layer, the MAC layer, and the PHY layer to fourth wireless communication device 108. After being split at the PDCP level, the unicast transmission proceeds over a second radio link from the split Bearer 1 via the RLC layer, the MAC layer, and the PHY layer to fourth wireless communication device 108.

Figure 5:
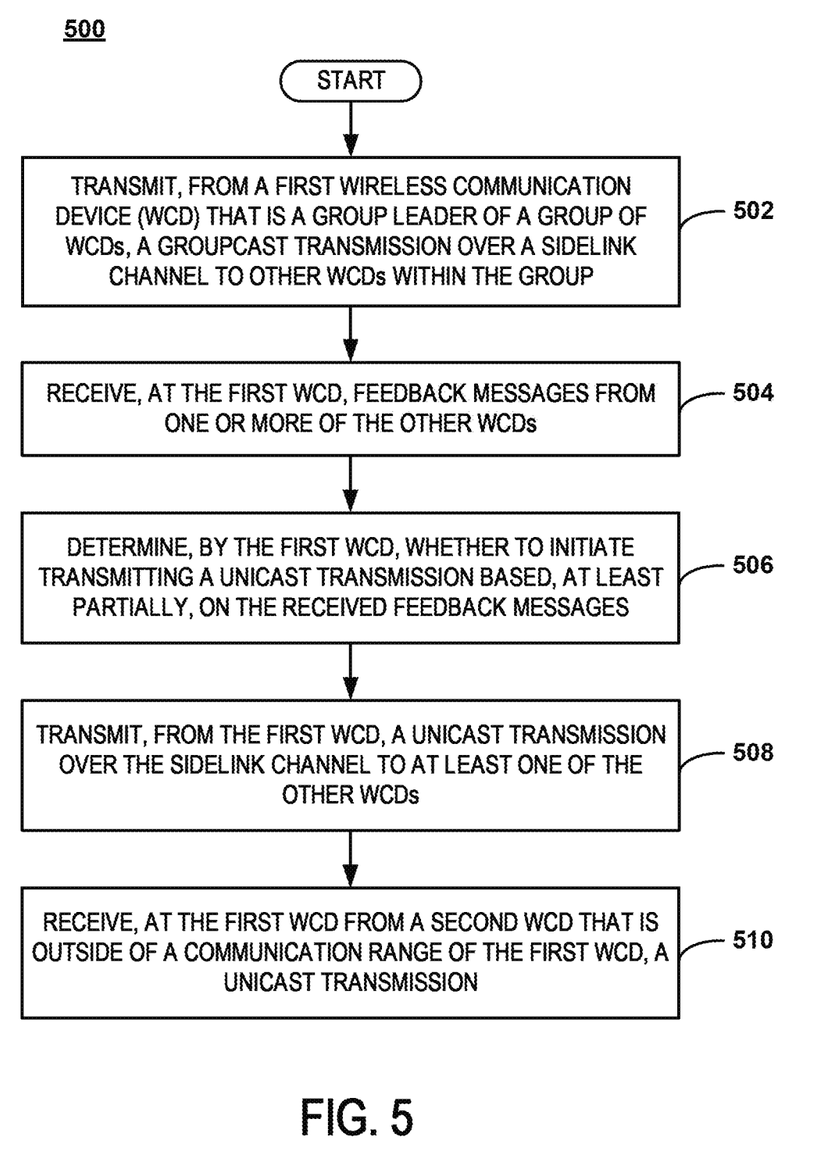
FIG. 5 is a flowchart of an example of a method in which a group leader of a group of wireless communication devices (1) transmits a groupcast transmission over a sidelink channel to other wireless communication devices within the group, (2) initiates unicast transmissions over the sidelink channel to at least one of the other wireless communication devices within the group, and (3) receives a unicast transmission from a wireless communication device that is outside of a communication range of the group leader.

FIG. 5 is a flowchart of an example of a method in which a group leader of a group of wireless communication devices (1) transmits a groupcast transmission over a sidelink channel to other wireless communication devices within the group, (2) initiates unicast transmissions over the sidelink channel to at least one of the other wireless communication devices within the group, and (3) receives a unicast transmission from a wireless communication device that is outside of a communication range of the group leader. The method 500 begins at step 502 with transmitting, from first wireless communication device 102, which is a group leader of a group of wireless communication devices, a groupcast transmission over a sidelink channel to other wireless communication devices within the group. At step 504, first wireless communication device 102 receives feedback messages from one or more of the other wireless communication devices. At step 506, first wireless communication device 102 determines whether to initiate transmitting a unicast transmission based, at least partially, on the received feedback messages. At step 508, first wireless communication device 102 transmits a unicast transmission 118 over the sidelink channel to at least one of the other wireless communication devices 108. At step 510, first wireless communication device 102 receives, from a wireless communication device 110 that is outside of communication range 112 of first wireless communication device 102, a unicast transmission 120. In other examples, one or more of the steps of method 500 may be omitted, combined, performed in parallel, or performed in a different order than that described herein or shown in FIG. 5. In still further examples, additional steps may be added to method 500 that are not explicitly described in connection with the example shown in FIG. 5.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
transmitting, from a first wireless communication device that is a group leader of a group of wireless communication devices, a groupcast transmission over a sidelink channel to other wireless communication devices within the group of wireless communication devices; and
transmitting, from the first wireless communication device, a unicast transmission over the sidelink channel to at least one of the other wireless communication devices, the groupcast transmission and the unicast transmission being transmitted on a same, single data bearer.

2. The method of claim 1, wherein the wireless communication devices are vehicle user equipment devices (VUEs).

3. The method of claim 2, wherein the group is a platoon of VUEs.

4. The method of claim 1, further comprising:
receiving, at the first wireless communication device, feedback messages from one or more of the other wireless communication devices; and
determining, by the first wireless communication device, whether to initiate transmitting the unicast transmission based, at least partially, on the received feedback messages.

5. The method of claim 4, wherein the feedback messages are Hybrid Automatic Repeat Request (HARQ) feedback messages.

6. The method of claim 4, wherein the feedback messages are keep-alive response messages.

7. The method of claim 1, wherein first wireless communication device simultaneously transmits the groupcast transmission and the unicast transmission.

8. The method of claim 7, wherein the groupcast transmission contains a first set of data and the unicast transmission contains a second set of data that is the same as the first set of data.

9. The method of claim 1, wherein the groupcast transmission includes an indication that transmission of data via groupcast transmission will be switched to transmission of data via unicast transmission.

10. The method of claim 9, further comprising:
receiving, at the first wireless communication device from a second wireless communication device that is outside of a communication range of the first wireless communication device, a unicast transmission.

11. The method of claim 1, wherein the same, single data bearer is split at a Packet Data Convergence Protocol level, the groupcast transmission transmitted over a first radio link from the split same, single data bearer, the unicast transmission transmitted over a second radio link from the split same, single data bearer.

12. A wireless communication device that is a group leader of a group of wireless communication devices, the wireless communication device comprising:
a transmitter configured to:
transmit a groupcast transmission over a sidelink channel to other wireless communication devices within the group of wireless communication devices, and
transmit a unicast transmission over the sidelink channel to at least one of the other wireless communication devices,
the transmitter being further configured to transmit the groupcast transmission and the unicast transmission on a same, single data bearer.

13. The wireless communication device of claim 12, wherein the wireless communication device and the other wireless communication devices are vehicle user equipment devices (VUEs).

14. The wireless communication device of claim 13, wherein the group is a platoon of VUEs.

15. The wireless communication device of claim 12, further comprising:
a receiver configured to receive feedback messages from one or more of the other wireless communication devices; and
a controller configured to determine whether to initiate transmitting the unicast transmission based, at least partially, on the received feedback messages.

16. The wireless communication device of claim 12, wherein the transmitter is further configured to simultaneously transmit the groupcast transmission and the unicast transmission.

17. The wireless communication device of claim 16, wherein the groupcast transmission contains a first set of data and the unicast transmission contains a second set of data that is the same as the first set of data.

18. The wireless communication device of claim 12, wherein the groupcast transmission includes an indication that transmission of data via groupcast transmission will be switched to transmission of data via unicast transmission.

19. The wireless communication device of claim 18, further comprising:
a receiver configured to receive, from another wireless communication device that is outside of a communication range of the wireless communication device, a unicast transmission.

20. The wireless communication device of claim 12, wherein the same, single data bearer is split at a Packet Data Convergence Protocol level, the groupcast transmission transmitted over a first radio link from the split same, single data bearer, the unicast transmission transmitted over a second radio link from the split same, single data bearer.

* * * * *